March 19, 1940.   J. H. TAYLOR   2,194,102
PISTON FOR INTERNAL COMBUSTION ENGINES
Filed July 13, 1938
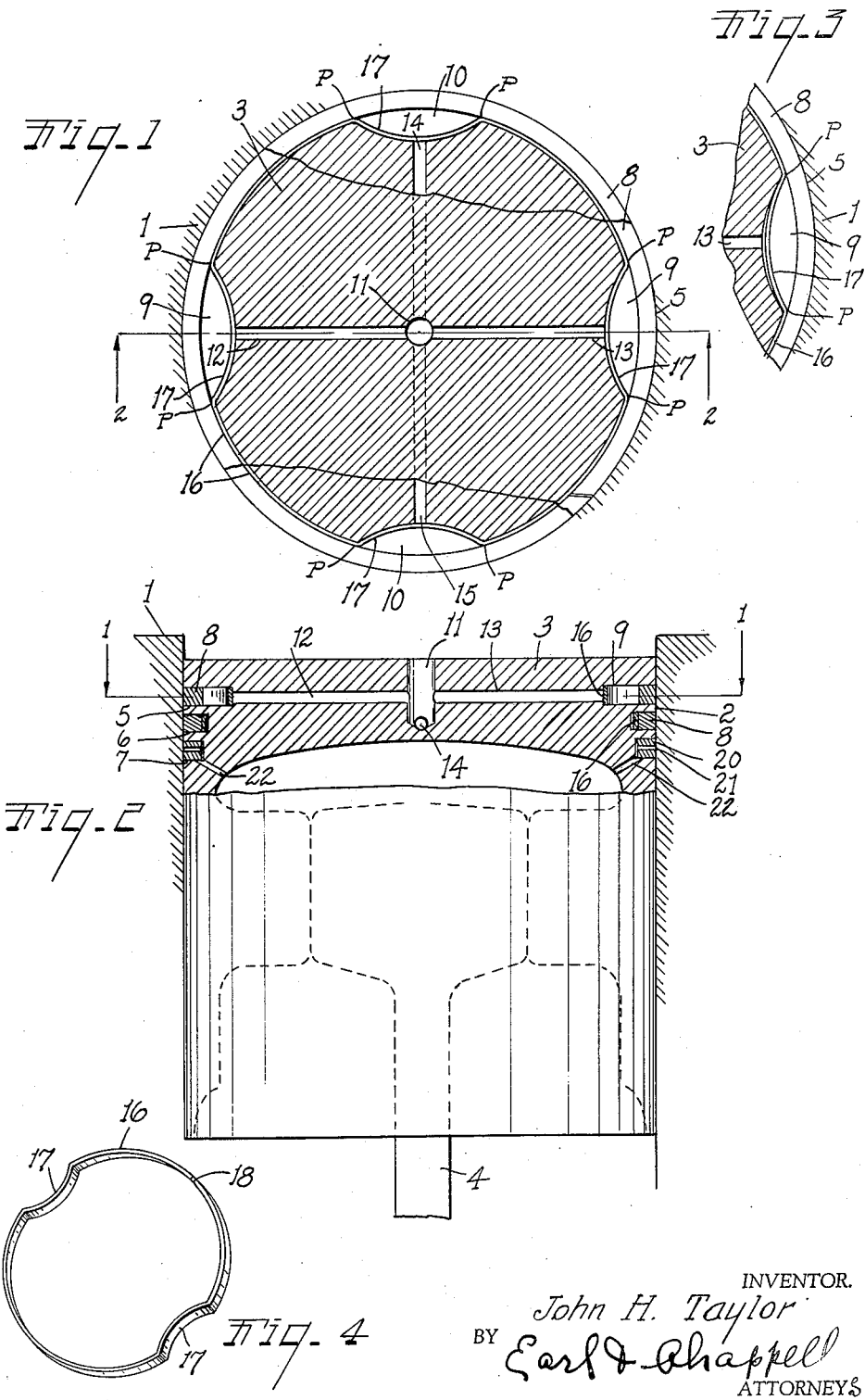
INVENTOR.
John H. Taylor
BY Earl F. Chappell
ATTORNEYS Patented Mar. 19, 1940

2,194,102

UNITED STATES PATENT OFFICE 2,194,102

PISTON FOR INTERNAL COMBUSTION ENGINES

John H. Taylor, Battle Creek, Mich.

Application July 13, 1938, Serial No. 218,962

8 Claims. (Cl. 309—31)

This invention relates to improvements in piston for internal combustion engines.

The main objects of my invention are:

First, to provide novel means for counteracting the tendency of a piston ring to spring inwardly on the compression and explosion strokes of the piston.

Second, to provide means for urging a piston ring radially outwardly under the influence of gas under pressure during the compression and explosion periods in the cycle of operation of an internal combustion engine to compensate for the inward springing effect exerted on the ring by gas in the cylinder.

Third, to provide means for uniformly balancing and sealing a piston ring radially against the cylinder wall during the entire cycle of operation of a piston, whereby to prevent loss of compression and vacuum.

Further objects relating to details and economies of my invention will definitely appear from the description to follow. The invention is defined in the claims.

A structure embodying the features of my invention is illustrated in the accompanying drawing, wherein:

Fig. 1 is a fragmentary view in transverse section on line 1—1 of Fig. 2, illustrating an internal combustion engine cylinder and piston provided with means in accordance with my invention for preventing loss of compression and vacuum in the operation thereof.

Fig. 2 is a fragmentary view partially broken away and in section on line 2—2 of Fig. 1.

Fig. 3 is a fragmentary view partially broken away and in section similar to Fig. 1, illustrating the operation of the ring sealing means at a different period in the cycle than that shown in Fig. 1.

Fig. 4 is a perspective view illustrating the piston ring expansion spring or sealing member constituting an element of my invention.

The present invention relates to means for counteracting the well known tendency of ordinary types of compression rings employed in internal combustion engine pistons to yield or contract radially inwardly on the compression and explosion strokes of the piston. This tendency results in loss of compression and resultant excessive waste of fuel and oil by reason of leakage past the compression rings.

My invention has for its purpose to correct the aforesaid objections by subjecting a piston ring to gas pressure during the compression and explosion strokes, transmitting the pressure to the ring through an inner spring member. This pressure is in the opposite direction to the pressure, tending to spring the piston ring inwardly and, accordingly, the ring is balanced automatically at all times in the cycle of piston operation so far as the gas pressure in the cylinder is concerned, i. e., during the compression, explosion, exhaust and intake strokes. In addition to overcoming loss of compression and vacuum by leakage past the piston, my provisions automatically assure that the piston ring maintains sealing contact with the cylinder wall, notwithstanding wear on the latter, for a much longer time than is possible in the case of piston rings and expanders in use at present.

Referring to the drawing, the reference numeral 1 indicates the conventional engine block of an internal combustion engine having cylinders 2 therein. It will be understood that a suitable head is likewise provided carrying intake and exhaust valves and ignition means. However, I have omitted the same from the drawing for the purpose of simplifying the latter.

The numeral 3 designates a piston of cast iron or aluminum which is in general of conventional construction, this piston being slidable in cylinder 2 and having the usual piston rod 4 secured thereto. Piston 3 is provided with annular piston ring grooves 5, 6, and 7. The compression rings 8, illustrated as disposed in the two upper grooves 6 and 7, are of the conventional split cast iron type. The ring 20 in the groove 7 is of the type commonly designated as an oil ring and has slots 21 to permit passage of oil to the drain ports or holes 22 of the piston.

The foregoing construction is well known in the internal combustion engine art, and I desire to stress the fact that by reason of its relying on well known parts such as the piston and rings just described, the structural details of my invention may be quickly and inexpensively embodied in existing types of engines. The said invention will now be described in detail.

Referring to Figs. 1 and 2, the two upper grooves 5 and 6 are each provided with a pair of diametrically opposed arcuate recesses, those in groove 5 being designated 9 and spaced 90° from those in groove 6 which are designated 10. Although the dimensions thereof may be altered, I find it desirable to form the recesses with a substantial radius of curvature.

The piston 3 is provided with a central bore or port 11 extending axially of the piston and with which the four radial branch passages 12, 13, 14, and 15 communicate. Passages 12 and 13 communicate with the opposed recesses 9 in groove 5, whereas passages 14 and 15 are at a lower elevation and at right angles to passages 12 and 13 so as to communicate with recesses 9 10 in groove 6.

The expansible spring inner expanding and sealing ring or member 16 is provided for each of the grooves 5 and 6. These members are similar in outline to the outline of the bottom of the respective grooves 5 and 6, in that each sealing member is generally circular and carries a pair of arcuate concaved portions or arches 17 adapted to seat or nest respectively in or against the groove recesses 9 and 10 in sealing relation to the radial passages 12, 13, 14, and 15 at the point of communication thereof with the recesses. Such a seal member or spring is illustrated in Fig. 4. It will be observed that the split 18 therein is positioned angularly 90° from the concaved portions 17. The spring is made of flat steel spring stock approximately equal in width to the height of the grooves, whereby to prevent substantial leakage of compression past the spring.

In operation, the sealing members 16 are inserted in the ring grooves as illustrated in Figs. 1 and 2, with the concave portions or arches lying in register respectively with recesses 9 of groove 5 and with recesses 10 in groove 6. Piston rings 8 are then positioned in the grooves. In practice there will be sufficient clearance behind the sealing member 16 to permit proper spring functioning thereof although I have not attempted to illustrate the same. It should be noted that the sealing member 16 is preferably of spring steel and bears resiliently against the piston ring to urge the same outwardly in the well known manner of expansion springs or rings expanders. If desired, additional provision in the form of piston or ring engaging loops or the like may be made to emphasize this action. However, the expanders in accordance with my invention also exert a different type of augmented sealing effect on the piston ring because of the fact that fuel vapor during the compression stroke and the burned gases attending the explosion stroke enter the axial port 11 and radial branch ports 12, 13, 14, and 15, thus impinging the rear of the ring sealing member 16 at the arches 17 therein. By confining the area acted on by the gases to that included in arches 17, the likelihood of leakage above and beneath the ring sealing member is minimized.

This results in springing of said portions 17 from the position illustrated in Fig. 2 to that illustrated in Fig. 3, with the further result that the radial outward thrust on piston ring 3 at points P is greatly increased. This increases the unit sealing pressure on the cylinder wall and to a large extent eliminates loss of compression past the ring and excessive fuel and oil consumption during operation.

On the intake stroke, when a partial vacuum exists in the cylinder above the piston, the concaved portions 17 of the sealing member are snapped radially inward against the passages 12, 13, 14, and 15, thus automatically sealing the same and preventing loss of vacuum. It will be noted that by locating the single exhaust port in the center of the piston and utilizing a plurality of branch ports instead of providing a plurality of axial ports, I am able to equalize the outward thrust imparted to the piston ring at all the pressure points P around the periphery of the ring. This is especially advantageous because the instantaneous pressure existing in the cylinder directly after the explosion may vary at different points in the cylinder, due to the usual eccentric location of the ignition means.

From the foregoing it will be appreciated that I have provided means for automatically compensating for the tendency of gases and vapors to leak by the piston by balancing the ring radially and, moreover, that this tendency is counteracted exactly and only at the time in the cycle when it exists. It follows that cylinder wall wear is minimized, while at the same time an effective sealing action of the piston ring in out-of-round cylinders is accomplished. These results are had without in any way increasing the number of parts existing in present day piston construction, and moreover the changes necessary to permit installation of the sealing provisions in accordance with my invention in the usual engine piston are slight and inexpensive and readily effected by any normally skilled mechanic.

Although I have illustrated my inventive provisions in a preferred adaptation to an internal combustion engine, it will be apparent to those skilled in the art that their application is not unduly limited in this respect, but on the contrary the sealing member and related provisions of my invention are readily adaptable with few changes to use with any piston employing a compression ring or equivalent element for the purpose of offsetting loss of combustion thereby.

Having thus described my invention, what I claim as new and desire to secure by Letters Patent is:

1. In an internal combustion engine having a cylinder and a piston reciprocable therein provided with an annular groove receiving a compression ring, a sealing member for preventing loss of compression past the ring, comprising a generally circular flat steel spring having a plurality of concaved portions therein, said spring being disposed in said groove in internal spring engagement with said ring, said piston having a central axial bore communicating with the cylinder above said piston and radial passages communicating with said bore, said groove having recesses formed therein and communicating with said radial passages, said recesses being similar in curvature to said concaved portions to accommodate the latter, said portions in normal position of the member lying across said passages and being subjected to compression pressure existing in said passages and bore on the compression and explosion strokes of the piston, whereby to urge the member outwardly for thrust engagement with the piston ring.

2. In an internal combustion engine having a cylinder and a piston reciprocable therein provided with an annular groove receiving a compression ring, a sealing member for preventing loss of compression past the ring, comprising a generally circular flat steel spring having a plurality of concaved portions therein, said spring being disposed in said groove in internal spring engagement with said ring, said piston having an axial bore communicating with the cylinder above said piston and radial passages communicating with said bore, said groove having recesses formed therein communicating with said radial passages to accommodate the portions, said portions in normal position of the member being subjected to compression pressure existing in said passages and bore on the compression and explosion strokes of the piston, whereby to urge the member outwardly for thrust engagement with the piston ring.

3. A piston reciprocable in a combustion engine cylinder and means for preventing leakage past the piston, comprising a piston ring mounted in a groove in the piston and a sealing member in said groove between the ring and piston, said sealing member having oppositely disposed concaved arches therein and the groove having recesses to receive said concaved arches, said piston having a central port therein extending to the upper surface thereof and having radial passages communicating with said port and groove recesses, whereby to subject said arches to compression pressure in the cylinder and urge the member into thrust engagement with the piston ring to increase the unit cylinder wall pressure exerted by the latter.

4. A piston reciprocable in a combustion engine cylinder and means for preventing leakage past the piston, comprising a piston ring mounted in a groove in the piston and an annular sealing member in said groove between the ring and piston and in radial thrust engagement with the former, said piston having a passage therein communicating said groove with the pressure in the cylinder above the piston, whereby to urge the member into thrust engagement with the piston ring to increase the unit cylinder wall pressure exerted by the latter, said sealing member having an inwardly offset portion directly subject to the pressure in said passage.

5. In an internal combustion engine having a cylinder and a piston reciprocable therein provided with a piston ring receiving groove, said piston having axial and radial passages communicating the groove with the cylinder above the piston, means for increasing the pressure exerted on the cylinder wall by the piston ring during the compression stroke of the piston, comprising a flat steel expansible member in said groove between the piston ring and said piston, said member being approximately equal in width to the height of said groove, the compression pressure in the cylinder being effective on said member to thrust the latter outwardly against the ring, said member having concaved arches and said piston groove having concaved recesses to receive the arches, whereby to localize the application of pressure to the member and transmit pressure from the member to the piston ring at points at the extremities of said arches.

6. In an internal combustion engine having a cylinder and a piston reciprocable therein provided with a piston ring receiving groove, said piston having passages communicating said groove with the cylinder above the piston, means for increasing the pressure exerted on the cylinder wall by a piston ring in said groove, particularly during the compression stroke of the piston, comprising an expansible member in said groove between the piston ring and said piston and in radial thrust engaging with the former, the compression pressure in the cylinder being effective on said member to thrust the latter outwardly against the rings, said member having concaved portions subject to the pressure in said passages.

7. In combination, a piston having compression ring receiving grooves, piston rings therein, and a pair of generally circular flat expansion spring members each having a plurality of concave arches therein, said grooves having provision for receiving said arches in nesting relation, with the arches on the respective members disposed at an angle to one another, said piston having a central axial port communicating with the cylinder above the piston and radial branch ports communicating with said port and said grooves adjacent said arches, whereby to subject the latter to compression pressure above the piston.

8. A device for preventing loss of compression and vacuum in an internal combustion engine cylinder having a piston reciprocable therein, comprising a generally circular split member of flat spring steel having arcuate arches therein, said piston having a piston ring receiving groove therein provided with arcuate recesses adapted to receive said arches, said piston having passages communicating said recesses with the cylinder above the piston whereby to subject said arches to compression existing in the cylinder, said arches when under compression expanding outwardly to engage the rear of the piston ring and thereby increase the unit cylinder wall sealing pressure of the latter.

JOHN H. TAYLOR.